US012809347B2

(12) United States Patent
Jäger et al.

(10) Patent No.: US 12,809,347 B2
(45) Date of Patent: Nov. 24, 2026

(54) METHODS AND SYSTEMS FOR ADAPTING A FEED RATE OF A FEED CONTROL ON NUMERICALLY CONTROLLED MACHINE TOOLS

(71) Applicant: Siemens Aktiengesellschaft, Munich (DE)

(72) Inventors: Tobias Jäger, Baiersdorf (DE); Hans-Georg Köpken, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 287 days.

(21) Appl. No.: 18/288,735

(22) PCT Filed: Apr. 25, 2022

(86) PCT No.: PCT/EP2022/060858
§ 371 (c)(1),
(2) Date: Oct. 27, 2023

(87) PCT Pub. No.: WO2022/229076
PCT Pub. Date: Nov. 3, 2022

(65) Prior Publication Data

US 2024/0201664 A1 Jun. 20, 2024

(30) Foreign Application Priority Data

Apr. 29, 2021 (EP) .................................... 21171260

(51) Int. Cl.
*G05B 19/416* (2006.01)
*G05B 19/4069* (2006.01)

(52) U.S. Cl.
CPC ..... *G05B 19/4163* (2013.01); *G05B 19/4069* (2013.01); *G05B 2219/43124* (2013.01)

(58) Field of Classification Search
CPC ............ G05B 19/4069; G05B 19/4065; G05B 2219/42163; G05B 19/404; G05B 19/406;
(Continued)

(56) References Cited

U.S. PATENT DOCUMENTS 4,833,617 A * 5/1989 Wang ................ G05B 19/4163 700/173
5,418,711 A 5/1995 Pomerleau et al.
(Continued)

FOREIGN PATENT DOCUMENTS

CN 101201612 A 6/2008
CN 102043876 A 5/2011
(Continued)

OTHER PUBLICATIONS

PCT International Search Report and Written Opinion of International Searching Authority mailed Aug. 2, 2022 corresponding to PCT International Application No. PCT/EP2022/060858 filed Apr. 25, 2022.

*Primary Examiner* — Darrin D Dunn
(74) *Attorney, Agent, or Firm* — Henry M Feiereisen, LLC

(57) ABSTRACT

A computer-implemented method provides setpoint values for a feed rate for adaptive feed control on numerically controlled machine tools. Upon machining a workpiece with a tool, receiving a real-time data with a current state of at least one controlled axis, determining actual values of at least one cutting force of the tool based on the real-time data, receiving a look-ahead data associated with a predicted state of the at least one controlled axis, simulating the machining of the workpiece based on the real-time data and the look-ahead data, generating simulated values of the at least one cutting force of the tool, determining at least one setpoint value for the feed rate of the at least one controlled
(Continued)

axis based on the simulated values and the actual values of the at least one cutting force of the tool, and providing the at least one setpoint value.

19 Claims, 4 Drawing Sheets

(58) Field of Classification Search
CPC .............. G05B 19/416; G05B 19/4163; G05B 2219/23456; G05B 2219/34095; G05B 2219/35167; G05B 2219/35386; G05B 2219/37355; G05B 19/316; G05B 19/41885; G05B 2219/32215; G05B 2219/32221; G05B 2219/32342; G05B 2219/33301; G05B 2219/35308; G05B 2219/35311
See application file for complete search history.

(56) References Cited

U.S. PATENT DOCUMENTS

| | | | | |
|---|---|---|---|---|
| 6,662,073 | B1 * | 12/2003 | Fujishima | G05B 19/4069 700/109 |
| 10,613,511 | B2 * | 4/2020 | Lin | G05B 19/408 |
| 11,298,766 | B2 * | 4/2022 | Shirai | B23H 7/08 |
| 2005/0154488 | A1 * | 7/2005 | Esterling | G05B 19/4065 700/175 |
| 2007/0016325 | A1 * | 1/2007 | Esterling | G05B 19/4065 700/175 |
| 2011/0048183 | A1 | 3/2011 | Shin | |
| 2014/0338468 | A1 * | 11/2014 | Ogawa | B23Q 17/0957 73/862.041 |
| 2015/0176570 | A1 | 6/2015 | Egedal et al. | |
| 2017/0227945 | A1 * | 8/2017 | Wang | G05B 19/182 |
| 2017/0308058 | A1 | 10/2017 | Kreidler | |
| 2018/0113436 | A1 * | 4/2018 | Shimizu | G05B 19/4155 |
| 2020/0133228 | A1 * | 4/2020 | Tango | G05B 19/4068 |
| 2020/0133242 | A1 * | 4/2020 | Uenishi | G05B 19/408 |
| 2020/0333764 | A1 * | 10/2020 | Takahei | G05B 19/404 |
| 2020/0401107 | A1 * | 12/2020 | Koide | G05B 19/41 |

FOREIGN PATENT DOCUMENTS

| | | | |
|---|---|---|---|
| CN | 103792888 | A | 5/2014 |
| CN | 104728040 | A | 6/2015 |
| CN | 107111298 | A | 8/2017 |
| CN | 110221580 | A | 9/2019 |
| CN | 112180833 | A | 1/2021 |
| CN | 112355713 | A | 2/2021 |
| DE | 102 57 229 | A1 | 6/2004 |
| WO | WO 2012-153157 | A2 | 11/2012 |

* cited by examiner

METHODS AND SYSTEMS FOR ADAPTING A FEED RATE OF A FEED CONTROL ON NUMERICALLY CONTROLLED MACHINE TOOLS

CROSS-REFERENCES TO RELATED APPLICATIONS

This application is the U.S. National Stage of International Application No. PCT/EP2022/060858, filed Apr. 25, 2022, which designated the United States and has been published as International Publication No. WO 2022/229076 A1 and which claims the priority of European Patent Application, Serial No. 21171260.9, filed Apr. 29, 2021, pursuant to 35 U.S.C. 119 (a)-(d).

BACKGROUND OF THE INVENTION

The subject matter disclosed herein relates to methods and systems for adapting a feed rate of a feed control.

Furthermore, the subject matter disclosed herein relates to machine-executable components comprising instructions to carry out the said methods, to a machine-readable medium comprising the said machine-executable components, to a computer-readable data carrier having stored thereon the said machine-executable components, and to a data carrier signal carrying the said machine-executable components.

The subject matter disclosed herein also relates to a machine tool comprising the said systems.

The subject matter disclosed herein addresses the problem of finding a better feed rate. A high feed rate can lead to tool breakage (standstill, damage) or excessive tool wear (high tool cost). A low feed rate leads to long manufacturing times, also increasing cost.

A well-known approach is the offline simulation of the material removal process and the resulting cutting forces to determine the optimum feed rate (see U.S. Pat. No. 4,833,617). The methods disclosed in U.S. Pat. No. 4,833,617 cannot provide look ahead data. Also, if there are online modifications like a restart of a partially finished operation this can be handled by the online simulation, while a previously run offline simulation would be based on the nominal sequence only, leading to incorrect results.

A well-known product implementation is VERICUT by CGTech.

Some prior art methods have the advantage of look-ahead in terms of the path, but they cannot take actual material and tool parameters into account. The exact values depend on the material batch and the wear of the cutting tool.

Therefore, there is a need for systems and methods that allow to improve the feed rate adaption during the machining process and to optimize the operation of the machine tool.

SUMMARY OF THE INVENTION

In order to achieve this objective, the present invention provides a computer-implemented method for providing setpoint values for a feed rate for adaptive feed control on numerically controlled machine tools, e. g. for milling, turning, grinding, drilling. The steps of the method are performed upon machining a workpiece with a tool. The method comprises a step of receiving, e.g. with a first interface, a real-time data associated with a current state of at least one controlled axis.

The receiving of the real-time data can be performed continuously or periodically.

The method also comprises a step of determining actual values of at least one cutting force of the tool based on the realtime data.

Furthermore, the method comprises a step of (continuously or periodically) receiving, e.g. with a second interface, a look-ahead data associated with a predicted state of the at least one controlled axis.

The receiving of the look-ahead data can be performed continuously or periodically.

The method further comprises a step of simulating the machining of the workpiece based on the real-time data and on the look-ahead data, for example with a computation unit, such as an edge device or CNC, wherein simulated values of the at least one cutting force of the tool are generated.

The simulating the machining of the workpiece can be performed continuously or periodically.

Simulating based on both the real-measurement and the look-ahead data allows to avoid transient force spikes that could lead to damage of the workpiece, of the tool, the workpiece or the machine (especially the bearings of the main spindle).

Furthermore, the method comprises a step of determining at least one setpoint value for the feed rate of the at least one controlled axis based on the simulated values and on the actual values of the at least one cutting force of the tool, and a step of providing the at least one setpoint value for the feed rate of the at least one controlled axis, e.g. with a third interface.

Running the said method (and the simulation included in the method) during the manufacturing process allows to combine benefits of simulation to look ahead with the use of actual values to adapt to reality.

In other words, it allows the machine tool augmented with a system that carries out the said method to react to changes in the material properties or tool wear and to change the feed rate before the actual values show a dynamic change.

In an embodiment, the real-time data comprises data associated with measured values of the at least one cutting force of the tool and/or torque of the spindle and/or speed of the tool and/or position (e.g. as a 6D-tuple for position and orientation) of the tool.

In an embodiment, the actual values of at least one cutting force of the tool are determined from the torque of the spindle. This can be of an advantage, because there is no need for extra force sensors in this case.

The force/torque of the feed axis drives can also be used to get further information about the cutting force. Also, the position measurement systems (encoders) in the machine tool can give an indication of the cutting force.

In an embodiment, the look-ahead data comprises data associated with predicted values of speed and/or position (e.g. 6D, position and orientation) of the tool.

In an embodiment, the look-ahead data is generated for a pre-defined time interval, wherein the pre-defined time interval is shorter than a brakeage time of the at least one controlled axis.

In an embodiment, the length of the pre-defined time interval (look-ahead time interval) is from about 10 ms to about 1000 ms, particularly 100 ms.

In an embodiment, the simulating the machining of the workpiece comprises, particularly consists of simulating a material removal, (e.g. followed by) calculating the at least one cutting force.

If the geometry of the workpiece and the path of the tool are not modified during execution/machining (i.e. not interrupted by the user, no restart after partial completion, . . . )

the material removal calculation could be done offline. The method, however, is still beneficial if the cutting force calculation is done online, since the material and tool parameters can be adapted to reality.

In an embodiment, the simulating the at least one cutting force comprises utilizing at least one of geometry tolerances, material parameters, tool parameters. These parameters have nominal values and some variation (due to raw workpiece, material batch, tool wear, etc.).

In an embodiment, the determining at least one setpoint value for the feed rate based on the at least one simulated cutting force comprises comparing, e.g. continuously comparing, the simulated values of the at least one cutting force with the actual values of the at least one cutting force, choosing the at least one setpoint value for the feed rate so that the actual values match the simulated values.

In an embodiment, the acquiring/measuring is performed periodically, particularly with a period of about 125 μs to about 5 ms, more particularly with a 2 ms period.

In an embodiment, the simulated values of the at least one cutting force of the tool comprise or are predicted (future) values of the at least one cutting force of the tool. In other words, a simulation ahead of real time is performed.

In an embodiment, the values of the at least one cutting force of the tool are predicted in time increments which are sufficient to adjust the feed rate before a force spike occurs, particularly shorter than a brakeage time of the at least one controlled axis, more particularly about 10 times shorter than the above-mentioned look-ahead time intervals.

Adjusting the feed rate before a force spike occurs allows the simulation to use parameters that are adjusted according to very recent (e.g. shorter than the above measurement period) measured values that characterize the current material and tool conditions.

In order to achieve the above-mentioned objective, the present invention also provides a method for adaptive feed control on numerically controlled machine tools, wherein the steps of the method are performed upon machining a workpiece with a tool according to a specification of a part program.

The method comprises a step of acquiring a real-time data associated with a current state of at least one controlled axis.

The method also comprises a step of generating (e.g. calculating) a look-ahead data associated with a predicted state of the at least one controlled axis, e.g. with a numerical control component, based on the specification of the part program.

Furthermore, the method comprises a step of providing at least one setpoint value for a feed rate of the at least one controlled axis according to the above-mentioned method.

The method further comprises a step of utilizing the at least one setpoint value of the feed rate to control the feed rate of the at least one controlled axis, e.g. with a numerical control component.

In order to achieve the above-mentioned objective, the present invention also provides a machine-executable component comprising instructions which, when the machine-executable component is executed by a computing system, cause the computing system to carry out the above-mentioned method for providing setpoint values for a feed rate.

In order to achieve the above-mentioned objective, the present invention also provides a system, which, for example, can be integrated into an edge device or into a CNC, comprising a memory, wherein the memory stores machine-executable components, and a processor, wherein the processor is operatively coupled to the memory and is configured to execute the machine-executable components, wherein the machine-executable components comprise the above-mentioned machine-executable component.

In an embodiment, the system further comprises a numerical control component configured to control at least one axis of a machine tool that comprises a tool and, during machining a workpiece with the tool according to a specification of a part program, to acquire a real-time data associated with a current state of the at least one controlled axis, to generate (e.g. calculate) a look-ahead data associated with a predicted state of the at least one controlled axis based on the specification of the part program, to transfer the real-time data and the look-ahead data to the machine-executable component, to receive, from the machine-executable component, at least one setpoint value of the feed rate, and to utilize the at least one setpoint value of the feed rate to control the feed rate of the at least one controlled axis.

In an embodiment, the numerical control component can be configured to acquire the real-time data from a sensor device that measures it.

Within the scope of the present disclosure the term "component" can refer to one or more software components, one or more hardware components, or a mixture of one or more hardware and software components.

BRIEF DESCRIPTION OF THE DRAWING

The above and other objects and advantages of the invention will be apparent upon consideration of the following detailed description of certain aspects indicating only a few possible ways which can be practiced. The description is taken in conjunction with the accompanying drawings, in which like reference characters refer to like parts throughout, and in which.

DETAILED DESCRIPTION OF PREFERRED EMBODIMENTS

Figure 1:
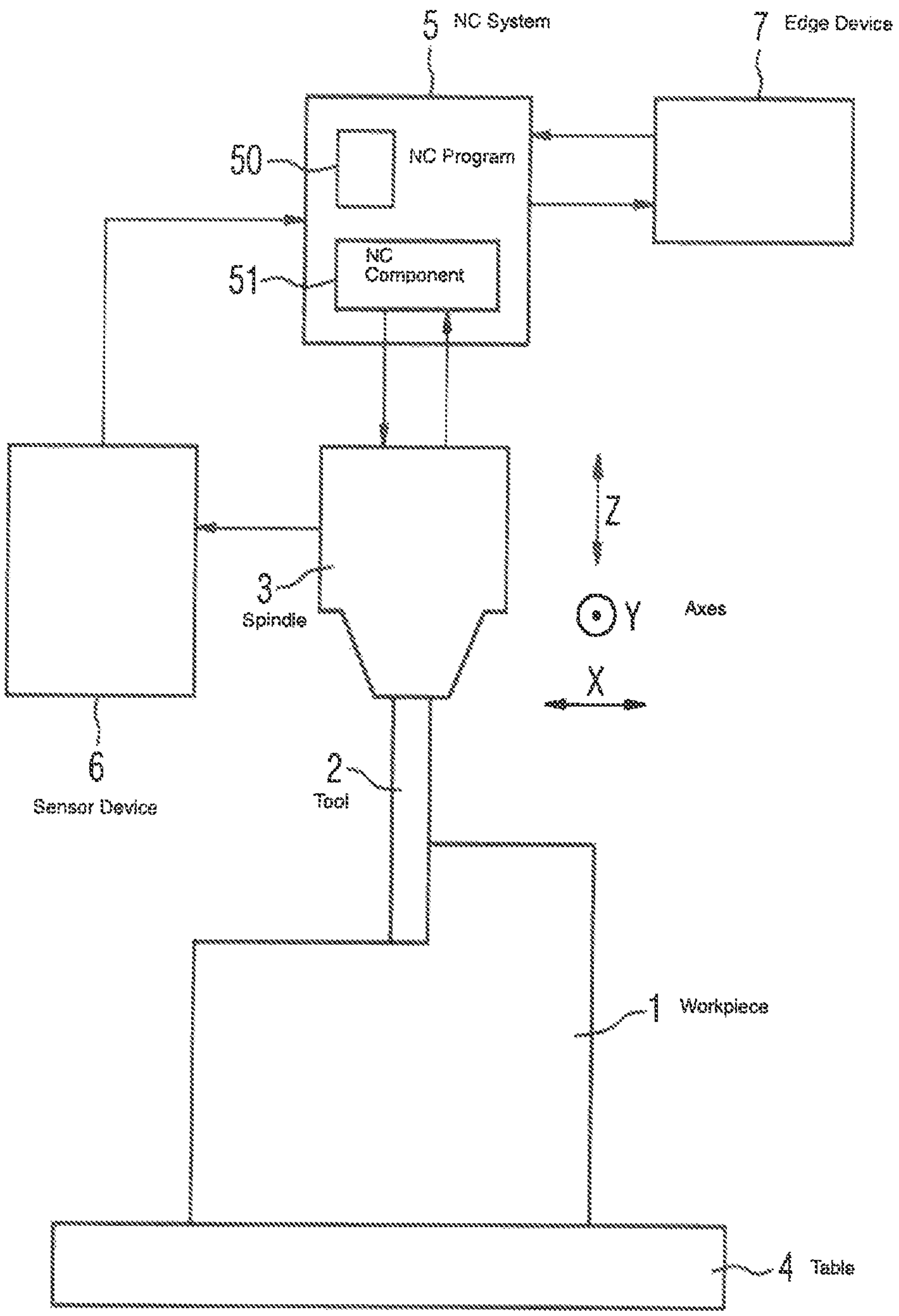
FIG. 1 schematically illustrates a section of a numerically controlled machine tool, FIG. 2 schematically illustrates a system for adaptive feed control of a machine tool.

FIG. 1 schematically illustrates a section of a numerically controlled machine tool. A workpiece 1 is fastened on a table 4. The workpiece 1 is processed by a tool 2 (here a cutter), which is fixed to a spindle 3 and is rotated by the spindle 3.

The tool 2 is movable relative to the workpiece 1 in three directions X, Y, Z. Other machine tools may allow further or other directions of movement between tool 2 and workpiece 1, for example by additional pivot axes.

The machining process is controlled by a numerical control (NC) system 5 that is associated with the machine tool. The NC system 5 controls the axes X, Y, Z of the machine tool. It sends control signals to and receives feedback data from the machine tool (arrows in FIG. 1 go in two directions). The NC system 5 can be designed as a CNC unit.

FIG. 1 illustrates a sensor device 6 associated with the machine tool. The sensor device 6 can comprise a plurality of different sensors to observe/monitor the machining process and to acquire (e.g. by measuring) different measurement data that can be used to estimate condition of the tool 2 and/or the workpiece 1. The measurement data can comprise acoustic and/or visual measurement and may be associated with vibrations of the tool 2, movements of the tool 2 and/or of the workpiece 1 etc. Therefore, the sensors can be acoustic, vibration, visual sensors etc. The visual sensor can be a camera, e.g. a 3D camera, or based on a laser technology. The sensor device 6 sends the acquired data to the NC system 5.

The NC system 5 comprises a part program or NC-program 50 and a numerical control (NC) component 51. The basic function of the NC component 51 is to read out the part program and, in a drive control (not shown), to drive the axes X, Y, Z and the spindle 3 in accordance with the specifications of the part program 50.

The NC component 51 interprets the part program and generates a look-ahead data associated with a predicted state or predicted states of the one or more controlled axes X, Y, Z. The look-ahead data can, for example, comprise a velocity profile for rotating the spindle 3. This allows a smooth and precise motion within the limitations of the drives/controlled axes X, Y, Z.

In other words, during the machining the movement of the tool 2 is defined according to the specification of the part program 50.

The NC component 51 can be designed as a software component.

It will be appreciated that the part program 50 can be a part of the NC component 51.

Furthermore, FIG. 1 illustrates an edge device 7 associated with the NC system 5. The edge device 7 is configured to exchange data with the NC system 5 and, in particular, with the NC component 51.

Figure 2:
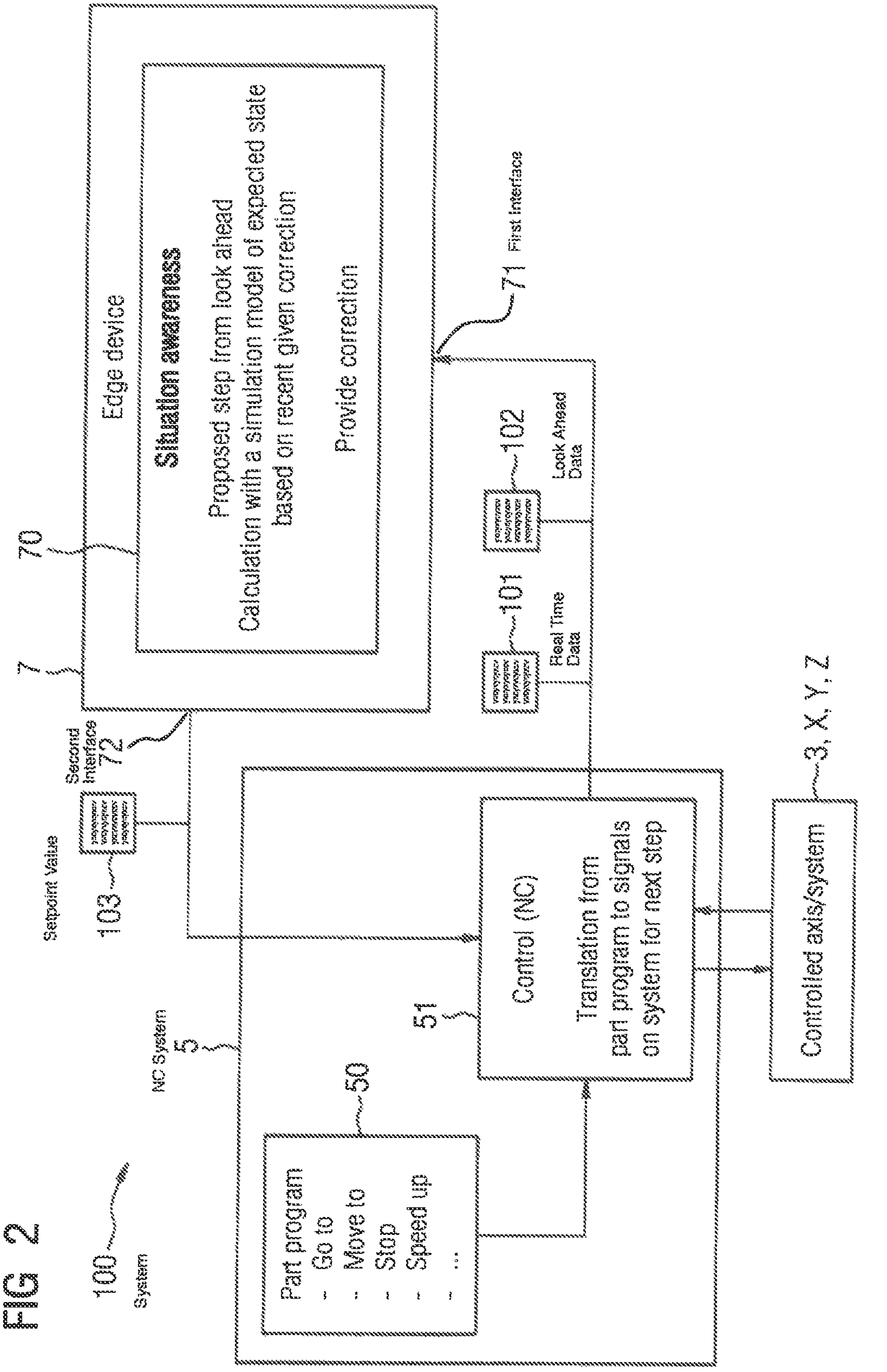

FIG. 2 illustrates a system 100 for adaptive feed control of a machine tool, e.g. of the machine tool of FIG. 1. In other words, FIG. 2 shows aspects regarding the control of the machine tool of FIG. 1 in more details.

The system 100 comprises the NC system 50 that drives one or more of the axes X, Y, Z and/or the spindle 3. Furthermore, the system 100 comprises the edge device 7. The edge device 7 can be designed as an industrial computing device and usually comprises a memory device and a processor device, wherein the memory device stores machine-executable components, and the processor device is operatively coupled to the memory device and is configured to execute the machine-executable components.

The edge device 7 comprises a machine-executable situation-awareness-module 70 for providing setpoint values for a feed rate for adaptive feed control on the machine tool.

In an embodiment the situation-awareness-module 70 can be a part of or integrated into the NC system 5.

During the machining the workpiece 1 with the tool 2 the situation-awareness-module 70 receives (see e.g. Step M10 in FIG. 3 or 4), for example with a first interface 71, a real-time data 101 associated with a current state of the controlled axes X, Y, Z.

Figure 4:
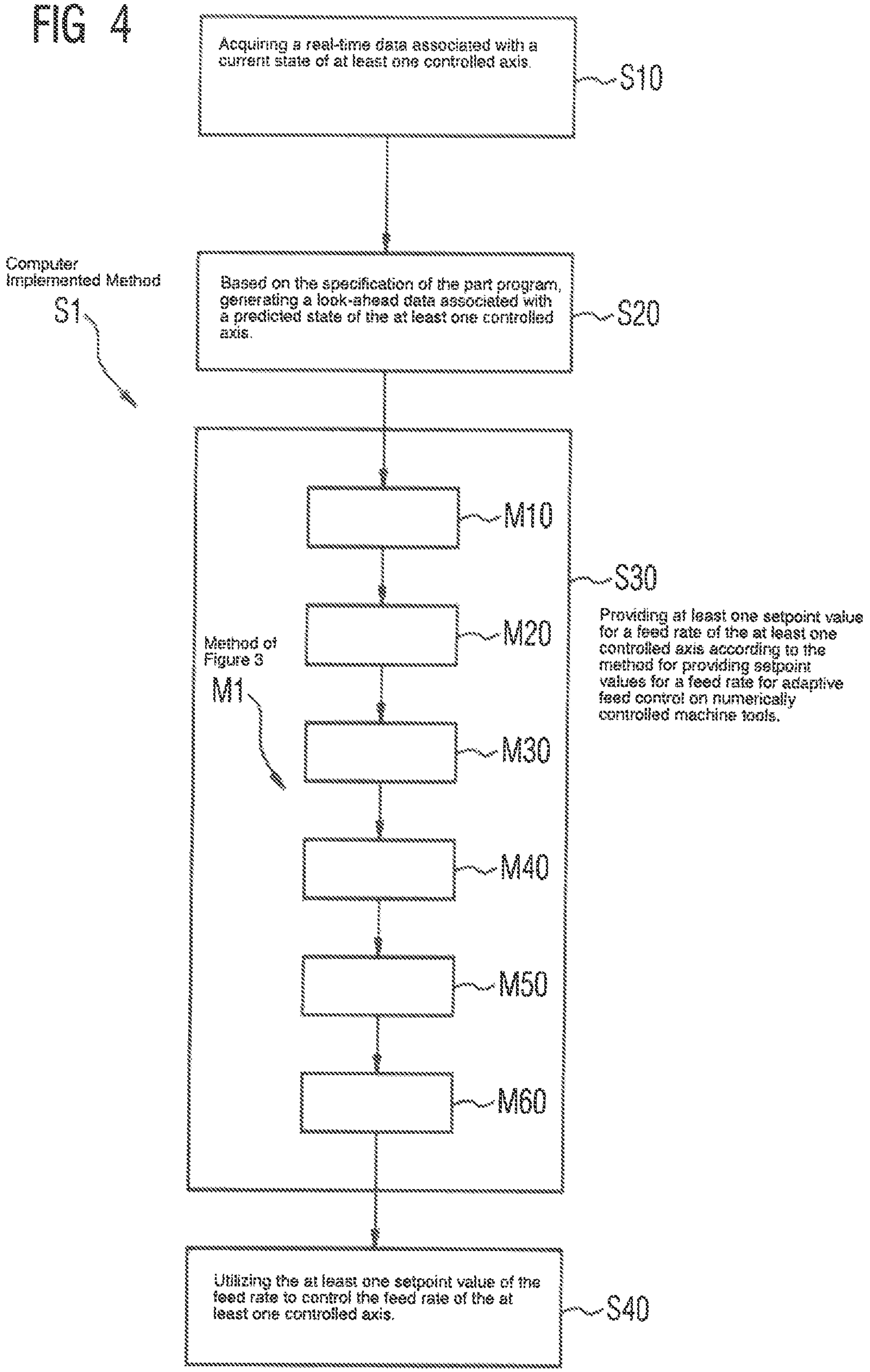
FIG. 4 shows a flow diagram of a method for adaptive feed control on numerically controlled machine tools

The real-time data 101 is acquired, e. g. through measuring by the sensor device 6, by the numerical control component 51 (see e.g. Step S10 in FIG. 4). The NC component 51 then sends the real-time data 101 to the situation-awareness-module 70.

The real-time data 101 can be received continuously or periodically by the situation-awareness-module 70.

The real-time data 101 can be acquired or measured continuously or periodically by the sensor device 6.

In an embodiment the acquiring or measuring is performed periodically, particularly with a period of about 125 μs to about 5 ms, more particularly with a 2 ms period.

The real-time data 101 can comprise data associated with measured values of cutting forces of the tool 2 and/or torque of the spindle 3 and/or speed of the tool 2 and/or position of the tool 2. The position of the tool can be a six-dimensional vector containing information about the position and the orientation of the tool 2.

Based on the real-time data, the situation-awareness-module 70 determines (see e.g. Step M20 in FIG. 3 or 4) actual values of cutting forces of the tool 2.

It will be appreciated by the skilled person that the calculation of the actual values of the cutting forces can be performed e.g. either by the NC component 51 or by the situation-awareness-module 70, so that "determining actual values of cutting forces of the tool 2" can mean reading out, if the cutting forces are calculated before reaching the situation-awareness-module 70. The actual values of cutting forces can be, for example, calculated by the NC component 51 based on the torque of the spindle.

Furthermore, the situation-awareness-module 70 receives, for example with the first interface 71 a look-ahead data 102 associated with a predicted state of the controlled axes X, Y, Z.

It will be appreciated that the situation-awareness-module 70 can comprise different interfaces for receiving the real-time data 101 and the look-ahead data 102.

The situation-awareness-module 70 receives (see e.g. Step M30 in FIG. 3 or 4) the look-ahead data 102 continuously or periodically.

The look-ahead data 102 is generated (determined or calculated) by the NC component 51 (see e.g. Step S20 in FIG. 4) based on the specification of the part program 50.

The look-ahead data 102 can be generated for a pre-defined time interval, wherein, in particular, the pre-defined time interval is shorter than a brakeage time of the controlled axis X, Y, Z.

The length of the pre-defined time interval (look-ahead time interval) can vary from about 10 ms to about 1000 ms. In an embodiment the look-ahead interval is about 100 ms.

Based on the real-time data 101 and on the look-ahead data 102 the situation-awareness-module 70 simulates (see e.g. Step M40 in FIG. 3 or 4) the machining of the workpiece 1 and generates simulated values of the cutting forces of the tool 2.

The simulating the machining of the workpiece 1 can for example comprise simulating a material removal, followed by calculating the cutting forces.

If the geometry of the workpiece and the path of the tool 2 are not modified during the execution (i.e. not interrupted by the user, no restart after partial completion, . . . ) the step of material removal calculation can be performed offline. However, it can be still beneficial if the cutting force simulation is done entirely online, since the material and tool parameters can be adapted to reality.

The simulation of the cutting forces can furthermore utilize geometry tolerances, material parameters, tool parameters, or a combination thereof. Each of them has nominal values and some variation (raw workpiece, material batch, tool wear, etc.).

The simulated values of the cutting forces of the tool 2 can comprise or can be predicted values of the cutting force of the tool 2. The simulation can be performed ahead of real time (look-ahead simulation of the cutting forces).

In an embodiment the values of the cutting forces of the tool 2 are predicted in time increments which are sufficient to adjust the feed rate before a force spike occurs. In particular the time increments can be shorter than a brakeage time of the controlled axes X, Y, Z, more particularly about 10 times shorter than the above-mentioned look-ahead time intervals.

The situation-awareness-module 70 can run the simulation continuously or periodically.

Figure 3:
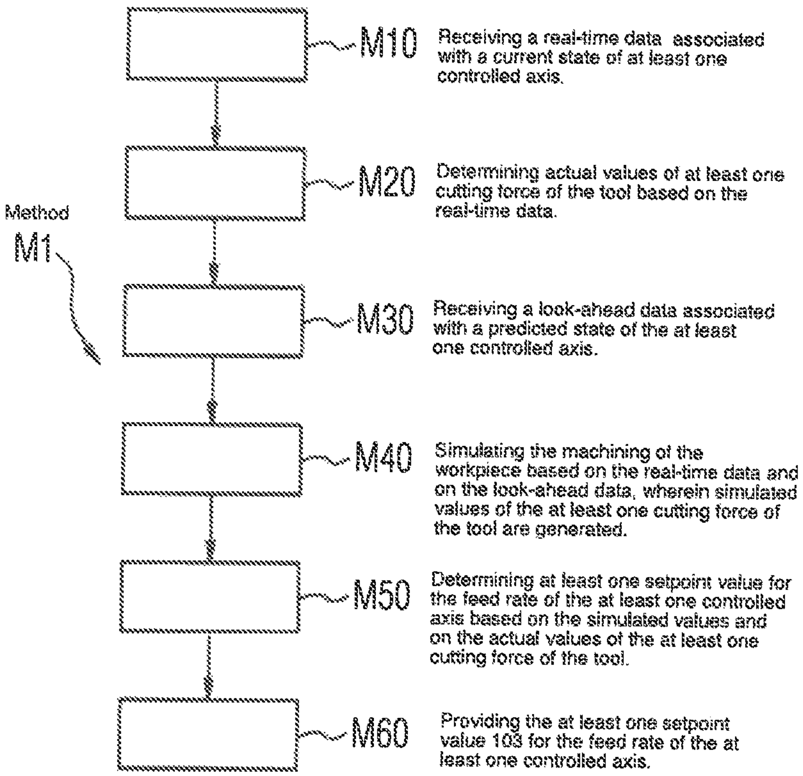
FIG. 3 shows a flow diagram of a computer-implemented method for providing setpoint values for a feed rate for adaptive feed control

Based on the simulated values and on the actual values of the cutting forces of the tool 2 the situation-awareness-module 70 determines (calculates) setpoint values for the feed rate of the controlled axes X, Y, Z (see e.g. Step M50 in FIG. 3 or 4).

The determining of the setpoint value for the feed rate based on the at least one simulated cutting force can comprise comparing, e. g. continuously comparing, the simulated values of the cutting forces with the actual values of the cutting forces and choosing the setpoint values for the feed rate so that the actual values match the simulated values.

Then the situation-awareness-module 70 provides the setpoint values (see e.g. Step M60 in FIG. 3 or 4). FIG. 2 shows an embodiment where the setpoint values are provided with a second interface 72 to the NC component 51 (see e.g. Step S30 in FIG. 4).

The actions to provide the setpoint values described above are performed during the machining process, i.e. online.

Subsequently the NC component 51 utilizes (see e.g. Step S40 in FIG. 4) the provided setpoint values of the feed rate to control the feed rate of the controlled axes X, Y, Z.

In the same manner the situation-awareness-module 70 can (additionally) provide setpoint values of the speed for the controlled axes X, Y, Z, so that the NC component 51 can adapt the speed accordingly.

FIG. 3 illustrates a flow diagram of a computer-implemented method M1 for providing setpoint values for a feed rate for adaptive feed control on numerically controlled machine tools. The method M1 can be implemented on the system 100 of FIG. 2. The method is carried out during machining a workpiece 1 with a tool 2 and comprises the steps of:

- M10 receiving a real-time data 101 associated with a current state of at least one controlled axis X, Y, Z,
- M20 determining actual values of at least one cutting force of the tool 2 based on the real-time data,
- M30 receiving a look-ahead data 102 associated with a predicted state of the at least one controlled axis X, Y, Z,
- M40 simulating the machining of the workpiece 1 based on the real-time data 101 and on the look-ahead data 102, wherein simulated values of the at least one cutting force of the tool 2 are generated,
- M50 determining at least one setpoint value 103 for the feed rate of the at least one controlled axis X, Y, Z based on the simulated values and on the actual values of the at least one cutting force of the tool 2, and
- M60 providing the at least one setpoint value 103 for the feed rate of the at least one controlled axis X, Y, Z.

FIG. 4 illustrates a flow diagram of a computer-implemented method S1 for adaptive feed control on numerically controlled machine tools. The method S1 can be implemented on the system 100 of FIG. 2 in a scenario depicted in FIG. 1. The method is carried out during machining a workpiece 1 with a tool 2 according to a specification of a part program 50 and comprises the steps of:

- S10 acquiring a real-time data 101 associated with a current state of at least one controlled axis X, Y, Z,
- S20 based on the specification of the part program 50, generating a look-ahead data 102 associated with a predicted state of the at least one controlled axis X, Y, Z,
- S30 providing at least one setpoint value 103 for a feed rate of the at least one controlled axis X, Y, Z according to the method for providing setpoint values for a feed rate for adaptive feed control on numerically controlled machine tools, e.g. to the method M1 of FIG. 3,
- S40 utilizing the at least one setpoint value 103 of the feed rate to control the feed rate of the at least one controlled axis X, Y, Z.

It will be appreciated that Step 30 comprises at least the steps of the method M1 of FIG. 3 and can comprise corresponding method steps according to one or more embodiments of the system described herein.

In summary, the adaptation of the simulation parameters of the material removal and cutting force model can yield a higher accuracy of the prediction compared to offline simulations, leading to a higher feed rate (lower production time) without the risk of overload.

The above-described embodiments of the present disclosure are presented for purposes of illustration and not of limitation. In particular, the embodiments described with regard to figures are only few examples of the embodiments described in the introductory part. Technical features that are described with regard to systems can be applied to augment methods disclosed herein and vice versa.

What is claimed is:

1. A computer-implemented method for adaptive feed control on numerically controlled machine tools, the method comprising:

machining a workpiece with a tool, and upon implementing feed rate control of at least one controlled axis:

- receiving a real-time data associated with a current state of the at least one controlled axis, wherein the real-time data comprises measured values of a torque of a spindle;
- determining actual values of at least one cutting force of the tool from the torque of the spindle;
- receiving a look-ahead data associated with a predicted state of the at least one controlled axis;
- simulating the machining of the workpiece based on the real-time data and on the look-ahead data, wherein simulated values of the at least one cutting force of the tool are generated, the simulated values comprising values of the at least one cutting force of the tool predicted in time increments, which are sufficient to adjust the feed rate before a force spike occurs;
- determining at least one setpoint value for the feed rate of the at least one controlled axis based on the simulated values and on the actual values of the at least one cutting force of the tool;
- providing the at least one setpoint value for the feed rate of the at least one controlled axis; and
- controlling the feed rate of the at least one controlled axis utilizing the at least one setpoint value.

2. The method of claim 1, wherein the real-time data comprises data associated with measured values of the at least one cutting force of the tool, speed of the tool, or position of the tool.

3. The method of claim 1, wherein the look-ahead data comprises data associated with predicted values of speed or position of the tool.

4. The method of claim 1, wherein the look-ahead data is generated for a pre-defined time interval, wherein the pre-defined time interval is shorter than a brakeage time of the at least one controlled axis.

5. The method of claim 4, wherein the length of the pre-defined time interval, the pre-defined time interval being a look-ahead time interval, is from about 10 ms to about 1000 ms.

6. The method of claim 1, wherein the simulating the machining of the workpiece comprises simulating a material removal and calculating the at least one cutting force.

7. The method of claim 1, wherein the simulating the at least one cutting force comprises utilizing at least one of geometry tolerances, material parameters, and tool parameters.

8. The method of claim 1, wherein the determining at least one setpoint value for the feed rate based on the at least one simulated cutting force comprises comparing the simulated values of the at least one cutting force with the actual values of the at least one cutting force, and choosing the at least one setpoint value for the feed rate so that the actual values match the simulated values.

9. The method of claim 1, wherein the time increments are shorter than a brakeage time of the at least one controlled axis.

10. The method of claim 1, wherein the look-ahead data comprises data associated with predicted values of speed or position of the tool.

11. The method of claim 1, further comprising machining the workpiece with the tool according to a specification of a part program, and during the machining:

acquiring the real-time data associated with a current state of at least one controlled axis; and based on the specification of the part program, generating the look-ahead data associated with the predicted state of the at least one controlled axis.

12. The method of claim 11, wherein the acquiring is performed periodically.

13. The method of claim 4, wherein the length of the pre-defined time interval, the pre-defined time interval being a look-ahead time interval, is about 100 ms.

14. The method of claim 1, wherein the simulating the machining of the workpiece consists of simulating a material removal and calculating the at least one cutting force.

15. The method of claim 11, wherein the acquiring is performed periodically with a period of about 125 μs to about 5 ms.

16. The method of claim 11, wherein the acquiring is performed periodically with a 2 ms period.

17. A machine-executable component comprising instructions which, when the machine-executable component is executed by a computing system, cause the computing system to carry out a method comprising:

machining a workpiece with a tool, and upon implementing feed rate control of at least one controlled axis:

receiving a real-time data associated with a current state of at the least one controlled axis, wherein the real-time data comprises measured values of a torque of a spindle;

determining actual values of at least one cutting force of the tool from the torque of the spindle;

receiving a look-ahead data associated with a predicted state of the at least one controlled axis;

simulating the machining of the workpiece based on the real-time data and on the look-ahead data, wherein simulated values of the at least one cutting force of the tool are generated, the simulated values comprising values of the at least one cutting force of the tool predicted in time increments, which are sufficient to adjust the feed rate before a force spike occurs;

determining at least one setpoint value for the feed rate of the at least one controlled axis based on the simulated values and on the actual values of the at least one cutting force of the tool;

providing the at least one setpoint value for the feed rate of the at least one controlled axis; and controlling the feed rate of the at least one controlled axis utilizing the at least one setpoint value.

18. A system comprising a memory, wherein the memory stores machine-executable components, and a processor, wherein the processor is operatively coupled to the memory and is configured to execute the machine-executable components, wherein the machine-executable components comprise a machine-executable component comprising instructions which, when the machine-executable component is executed by the processor cause the processor to carry out a method comprising:

machining a workpiece with a tool, and upon implementing feed rate control of at least one controlled axis;

receiving a real-time data associated with a current state of the at least one controlled axis, wherein the real-time data comprises measured values of a torque of a spindle;

determining actual values of at least one cutting force of the tool from the torque of the spindle;

receiving a look-ahead data associated with a predicted state of the at least one controlled axis;

simulating the machining of the workpiece based on the real-time data and on the look-ahead data, wherein simulated values of the at least one cutting force of the tool are generated, the simulated values comprising values of the at least one cutting force of the tool predicted in time increments, which are sufficient to adjust the feed rate before a force spike occurs;

determining at least one setpoint value for the feed rate of the at least one controlled axis based on the simulated values and on the actual values of the at least one cutting force of the tool;

providing the at least one setpoint value for the feed rate of the at least one controlled axis; and controlling the feed rate of the at least one controlled axis utilizing the at least one setpoint value.

19. The system of claim 18, further comprising a numerical control component configured to control the at least one axis of a machine tool that comprises the tool and, during machining the workpiece with the tool according to a specification of a part program, acquire the real-time data associated with the current state of the at least one controlled axis, based on the specification of the part program, generate the look-ahead data associated with the predicted state of the at least one controlled axis, transfer the real-time data and the look-ahead data to the machine-executable component, receive, from the machine-executable component, the at least one setpoint value of the feed rate, and utilize the at least one setpoint value of the feed rate to control the feed rate of the at least one controlled axis.

* * * * *